United States Patent
Ayvaci et al.

(10) Patent No.: US 11,756,309 B2
(45) Date of Patent: Sep. 12, 2023

(54) CONTRASTIVE LEARNING FOR OBJECT DETECTION

(71) Applicant: Waymo LLC, Mountain View, CA (US)

(72) Inventors: Alper Ayvaci, Santa Clara, CA (US); Feiyu Chen, Cupertino, CA (US); Justin Yu Zheng, Mountain View, CA (US); Bayram Safa Cicek, Los Angeles, CA (US); Vasiliy Igorevich Karasev, New York, NY (US)

(73) Assignee: Waymo LLC, Mountain View, CA (US)

( * ) Notice: Subject to any disclaimer, the term of this patent is extended or adjusted under 35 U.S.C. 154(b) by 409 days.

(21) Appl. No.: 17/148,148

(22) Filed: Jan. 13, 2021

(65) Prior Publication Data

US 2022/0164585 A1 May 26, 2022

Related U.S. Application Data

(60) Provisional application No. 63/117,406, filed on Nov. 23, 2020.

(51) Int. Cl.
*G06N 3/08* (2023.01)
*G06V 20/58* (2022.01)
*B60W 60/00* (2020.01)

(52) U.S. Cl.
CPC ......... *G06V 20/58* (2022.01); *B60W 60/001* (2020.02); *G06N 3/08* (2013.01); *B60W 2420/52* (2013.01); *B60W 2554/4049* (2020.02)

(58) Field of Classification Search
None
See application file for complete search history.

(56) References Cited

U.S. PATENT DOCUMENTS

| | | | |
|---|---|---|---|
| 2018/0032840 A1* | 2/2018 | Yu | G06V 10/774 |
| 2020/0394458 A1* | 12/2020 | Yu | G06V 10/82 |

OTHER PUBLICATIONS

Khosla et al., "Supervised contrastive learning," arXiv preprint arXiv:2004.11362, Apr. 2020, 23 pages.

(Continued)

*Primary Examiner* — Idowu O Osifade
(74) *Attorney, Agent, or Firm* — Fish & Richardson P.C.

(57) ABSTRACT

Methods, systems, and apparatus, including computer programs encoded on computer storage media, for training a neural network using contrastive learning. One of the methods includes obtaining a network input representing an environment; processing the network input using a first subnetwork of the neural network to generate a respective embedding for each location in the environment; processing the embeddings for each location in the environment using a second subnetwork of the neural network to generate a respective object prediction for each location; determining, for each of a plurality of pairs of the plurality of locations in the environment, whether the respective object predictions of the pair of locations characterize the same possible object or different possible objects; computing a respective contrastive loss value for each of the plurality of pairs of locations; and updating values for a plurality of parameters of the first subnetwork using the computed contrastive loss values.

26 Claims, 5 Drawing Sheets

(56) References Cited

OTHER PUBLICATIONS

Le-Khac et al., "Contrastive representation learning: A framework and review," IEEE Access, Oct. 2020, 28 pages.
Rukhovich et al., "IterDet: Iterative Scheme for ObjectDetection in Crowded Environments," arXiv preprint arXiv:2005.05708, May 2020, 13 pages.
Vaswani et al., "Attention is all you need," arXiv preprint arXiv: 1706.03762, Jun. 2017, 15 pages.
Veličković et al., "Graph attention networks," arXiv preprint arXiv: 1710.10903, Oct. 2017, 12 pages.

* cited by examiner

OBJECT PREDICTIONS 300

GRAPH 400

CONTRASTIVE LEARNING FOR OBJECT DETECTION

CROSS-REFERENCE TO RELATED APPLICATION

This application claims priority to U.S. Provisional Application No. 63/117,406, filed on Nov. 23, 2010. The disclosure of the prior application is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on inputs to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes a system implemented as computer programs on one or more computers in one or more locations that trains a neural network to perform object detection using contrastive learning. That is, the system can train the neural network to process data representing an environment, e.g., sensor data captured by one or more sensors operating in the environment, to detect one or more objects in the environment.

In this specification, "contrastive learning" refers to any process whereby a system determines an update to the values of one or more parameters of the neural network using, for each of one or more pairs of outputs of the neural network, a loss value that represents a difference between the pairs of outputs.

The system can process a network input that includes sensor data representing multiple locations in an environment using the neural network to generate (i) a respective embedding for each of the multiple locations in the environment and (ii) a respective object prediction for each of the multiple locations in the environment. The object prediction for a location in the environment characterizes a possible object that may be located at the location in the environment. For example, the object prediction for a location in the environment can include one or more of: (i) a likelihood that the possible object is actually located at the location in the environment, (ii) dimensions of the possible object given that the possible object is actually located at the location in the environment, (iii) a predicted class of the possible object given that the possible object is actually located at the location in the environment, or (iv) a likelihood that the predicted class of the possible object is correct.

For each of multiple pairs of locations in the environment, the system can determine whether the corresponding pair of object predictions of the pair of locations characterize the same possible object or different possible objects, e.g., by processing the corresponding pair of object predictions and/or a ground-truth output characterizing the objects that are actually located at the pair of locations in the environment.

Then, for each of the multiple pairs of locations, the system can then determine a respective contrastive loss value that represents a difference between the generated embeddings of the pair of locations, and update the parameter values of the neural network according to the determined contrastive loss values. In particular, for pairs of locations whose object predictions represent the same possible object, the contrastive loss value can be proportional to the difference between the generated embeddings. For pairs of locations whose object predictions represent different possible objects, the contrastive loss value can be inversely proportional to the difference between the generated embeddings. Thus, the contrastive loss values encourage the embeddings that correspond to the same possible object to be similar, while encouraging the embeddings that correspond to different possible objects to be dissimilar.

After the neural network has been trained using contrastive learning, the neural network can be deployed on an autonomous or semi-autonomous vehicle to perform object detection using sensor data captured by sensors on-board the vehicle.

The subject matter described in this specification can be implemented in particular embodiments so as to realize one or more of the following advantages.

Using contrastive loss functions as described in this specification, a training system can train a neural network to generate improved embeddings for respective locations in an environment. By enforcing that locations corresponding to the same possible object have similar embeddings and locations corresponding to different possible objects have dissimilar embeddings, the training system can teach the neural network to generate embeddings that are highly informative for the task of object detection. In particular, contrastive learning can improve performance of the neural network so that the neural network generates predictions that include fewer false positives (i.e., incorrectly detecting an object that is not in the environment) and more true positives (i.e., correctly detecting an object that is in the environment).

This specification also describes techniques for applying a contrastive learning loss function to embeddings generated using graph neural networks. When generating embeddings for a particular location in the environment, graph neural networks can leverage contextual information from neighboring locations in an environment, teaching the neural network to generate richer embeddings. In some such implementations described herein, the graph neural network uses an attention mechanism to pool the surrounding contextual information; using attention mechanisms in this way further improves the performance of embedding neural networks.

In some implementations described in this specification, a training system can train a neural network using multi-task learning by determining parameter updates using a contrastive learning loss function and one or more other loss functions, e.g., one or more supervised learning loss functions. Using multiple loss functions can further improve the performance of the neural network and reduce the amount of time and/or reduce the size of the training data set required to train the neural network.

In some such implementations, a training system can implement a contrastive learning loss function that leverages a ground-truth signal that is also used by a different loss function of the multiple loss functions, e.g., ground-truth bounding boxes for object detection that are also used for supervised training of a subnetwork that generates predicted bounding boxes. Thus, introducing contrastive learning into a training regime does not require additional ground-truth signals or an augmented training data set.

Furthermore, in some implementations described in this specification, contrastive learning can be implemented in a completely self-supervised fashion. That is, using a contrastive loss function to train a neural network does not require any ground-truth signals in the training data set. Instead, the contrastive learning function can rely solely on the generated outputs of one or more subnetworks of the neural network, e.g., the generated embeddings corresponding to each location in the environment.

In some implementations described in this specification, using contrastive learning when training a neural network does not introduce any additional time or computational costs at inference time, after the neural network is deployed. For example, a training system can use contrastive learning to improve embeddings in an embedding subnetwork that is already a component of the neural network. As another example, during training the training system can add one or more additional embedding subnetworks to the neural network, and apply a contrastive loss function to the outputs of the additional embedding subnetworks to improve the overall performance of the neural network. Then, after training is completed, the training system can remove the additional embedding subnetworks from the neural network before deploying the neural network. Thus, the training system improves the performance of the neural network while ensuring that the time and computational resources required to execute the neural network does not increase at inference time. That is, training the neural network using the additional embedding subnetworks improves the performance of the neural network even after the additional embedding subnetworks have been removed (e.g., by backpropagating the contrastive error through to other subnetworks of the neural network to improve the performance of the other subnetworks).

Ensuring that the time and computational efficiency of the neural network is minimized can be particularly important when the neural network is deployed in a time-constrained and/or a resource-constrained environment, e.g., when the neural network is deployed on-board a vehicle. As a particular example, the neural network can be used by the vehicle to detect pedestrians in the environment of the vehicle; in this use case, it is important for the neural network to generate predictions as quickly as possible so that the vehicle can react in unsafe situations, e.g., when a pedestrian unexpectedly steps in front of the vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that trains a neural network to perform object detection using contrastive learning.

Figure 1:
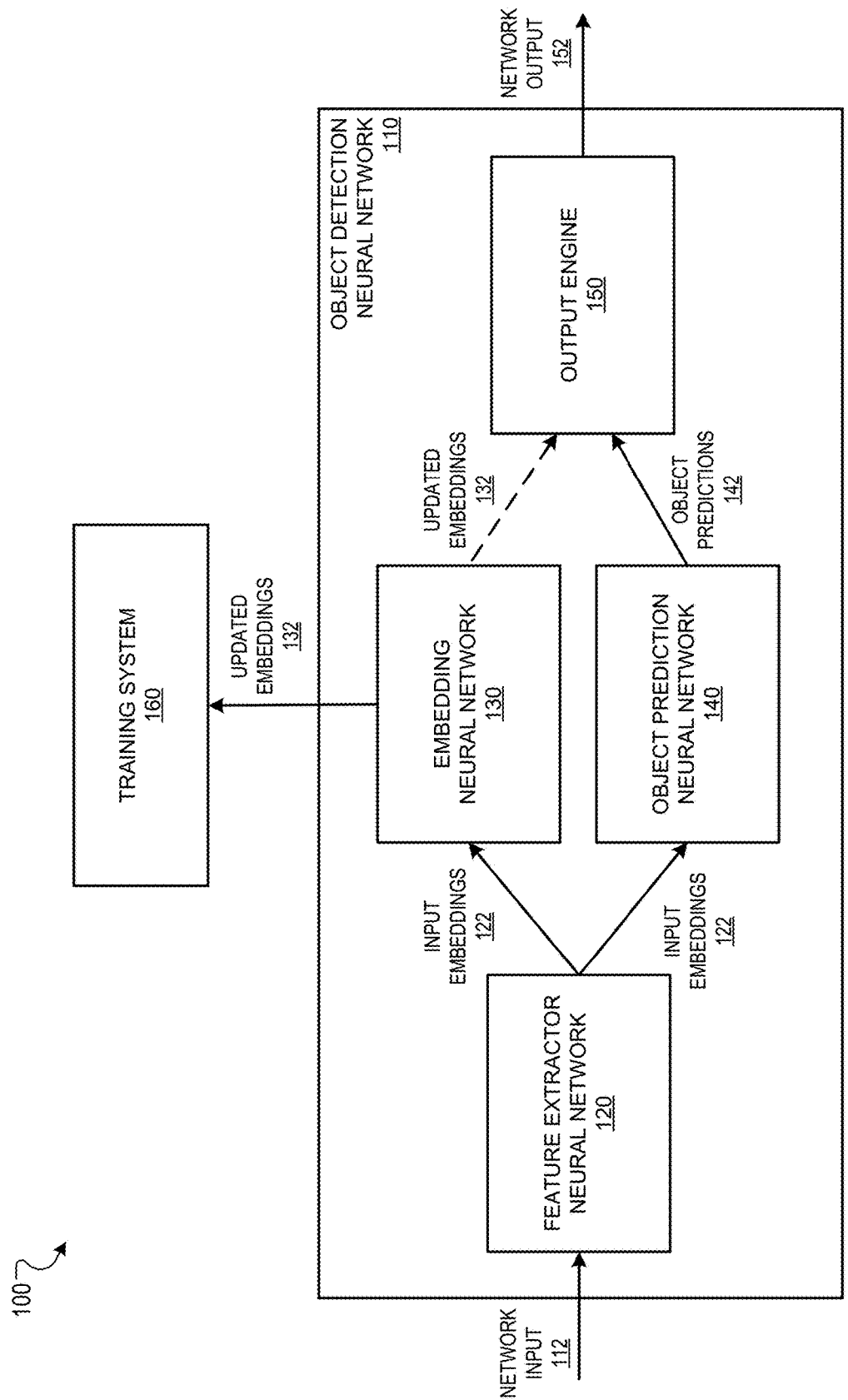
FIG. 1 is a diagram of an example system that includes an object detection neural network.

FIG. 1 is a diagram of an example system 100 that includes an object detection neural network 110. The system 100 is an example of a system implemented as computer programs on one or more computers in one or more locations, in which the systems, components, and techniques described below can be implemented.

The system 100 also includes a training system 160 that is configured to train the object detection neural network 110.

The object detection neural network 110 is configured to receive a network input 112 that represents an environment and to process the network input 112 to generate a network output 152 that identifies one or more object that are in the environment. The object detection neural network 110 can include a feature extractor neural network 120, an embedding neural network 130, an object prediction neural network 140, and an output engine 150.

The network input 112 can include any data representing the environment. For example, the network input 112 can include sensor data captured by one or more sensors operating in the environment, e.g., one or more images captured by one or more cameras and/or LIDAR data captured by one or more LIDAR sensors.

The feature extractor neural network 120 is configured to receive the network input 112 and to process the network input 112 to generate a respective input embedding 112 for each of multiple locations in the environment represented by the network input 112.

In this specification, an embedding is an ordered collection of numeric values that represents an input in a particular embedding space. For example, the embedding can be a vector of floating point or other numeric values that has a fixed dimensionality.

For example, the network input 112 can include an image of the environment that represents multiple spatial regions of the environment, where each region is depicted by one or more respective pixels in the image. The feature extractor neural network 120 can then process the image to generate a respective embedding for each represented spatial region. As a particular example, the network input 112 can include an image that includes multiple pixels each corresponding to a respective location in the environment, and the feature extractor neural network 120 can process the image to generate a respective embedding for each pixel in the image. In some implementations, the feature extractor neural network 120 includes one or more convolutional neural network layers that apply convolutional filters to the input image.

Instead or in addition to an image of the environment, the network input 112 can include LIDAR data that has been projected onto a two-dimensional image plane. A system can project the LIDAR data onto the image plane by converting, for each point in the LIDAR data, the three-dimensional coordinates of the point to two-dimensional coordinates. For example, the system can convert the three-dimensional coordinates of each point to two-dimensional coordinates using a camera model of a camera, e.g., the camera model of the camera that was used to capture the image of the environment included in the network input 112 as described above. Thus, the system can project the LIDAR data onto an image plane that has the same two-dimensional coordinate system as the image. After the projection of the LIDAR data, the image plane can include gray-scale objects formed from the projected points of the LIDAR data. The feature extractor neural network 120 can process the two-dimensional LIDAR image plane using one or more two-dimensional convolutional neural network layers.

The feature extractor neural network 120 can provide the input embeddings 122 to the object prediction neural network 140. The object prediction neural network 140 is configured to process the input embeddings 122 and to generate a respective object prediction 142 for each location represented by an input embedding 122. The object prediction 142 for a particular location characterizes a possible object that may be at the particular location in the environment.

The object prediction 142 for a particular location in the environment can include a value representing the likelihood that an object is actually located at the particular location in the environment, e.g., a floating point value between 0 and 1 representing the likelihood.

Instead or in addition, the object prediction 142 for a particular location in the environment can include a class prediction for the possible object that may be at the location. That is, the object prediction 142 can include a label or a probability distribution across labels for a class of the possible object, e.g., "vehicle," "cyclist," "pedestrian," "motorcyclist," etc. For example, if there are p possible classes for the objects in the environment, then the object prediction 142 can include p floating point values (e.g., in a p-dimensional vector) that each correspond to a respective class and represent a likelihood that the possible object is the respective class given that the possible object is actually located at the location in the environment. As another example, the object prediction 142 can include p floating point values that each correspond to a respective class and represent a likelihood that (i) the possible object is actually located at location in the environment and (ii) the possible object is the respective class.

In some implementations, the possible classes of the objects in the environment include a "background" class that indicates that there is not an object at the location, or that the object at the location does not belong to one of the other predetermined possible classes. The classes that are not the background class can be called "foreground" classes. For example, if there are two foreground classes, "pedestrian" and "vehicle", then the background class can indicate that either (i) there is not an object at the location in the environment or (ii) there is an object at the location in the environment but that the object is not a pedestrian or a vehicle (e.g., a building or a bush). In these implementations, the object prediction 142 can include p floating point values each corresponding to a respective class, where p−1 values correspond to a respective foreground class and represent a likelihood that the possible object is the foreground class given that the possible object is actually located at the location in the environment, and the remaining value corresponds to the background class and represents a likelihood that there is not an object at the location in the environment (or that the object is not one of the p−1 predetermined foreground classes).

Instead or in addition, the object prediction 142 for a particular location in the environment can include data representing dimensions of the possible object at the location, given that the possible object is actually located at the location. For example, the object prediction 142 can include a three-dimensional bounding box representing the dimensions of the possible object in a coordinate system of the environment, e.g., a three-dimensional bounding box centered at the location and defined by length, width, and height parameters. As another example, the object prediction 142 can include a two-dimensional bounding box representing the dimensions of the possible object in an image of the environment, e.g., a two-dimensional bounding box centered at the location and defined by a width parameter and a height parameter (e.g., where both parameters identify a number of pixels in the image).

In some implementations, the object prediction 142 for a particular location in the environment can include, for each of multiple possible classes of objects in the environment (e.g., for each possible class or for each foreground class), a respective data representing dimensions of the possible object at the location, given that the possible object is actually located at the location and given that the possible object is the possible class. For example, for each possible class, the object prediction 142 can include a respective bounding box representing the dimensions of the possible object, given that the possible object is the possible class.

The object prediction neural network 140 can include one or more convolutional neural network layers that are configured to process the input embeddings 122 to generate the object predictions 142. For example, the input embeddings 122 can be represented by an image with n channels, where each element of the image is an n-dimensional embedding corresponding to a respective location in the environment. In these implementations, the object prediction neural network 140 can process the image using convolutional neural network layers to generate the object predictions 142, thereby pooling, for each location in the environment, contextual information from neighboring locations in the environment to generate the object prediction 142 for the location.

Instead or in addition, the object prediction neural network 140 can include one or more feedforward neural network layers that are configured to process the input embedding 122 corresponding to a location (or, an updated representation of the input embedding 122 generated by a convolutional neural network layer as described above) to generate the object prediction 142 for the location.

In some implementations, the object prediction neural network 140 includes multiple subnetworks that each process the input embeddings 122 to generate a different component of the object prediction 142 for each location. For example, the object prediction neural network 140 can include a "class prediction" subnetwork that generates a respective class prediction for each location as described above, and a "bounding box" subnetwork that generates a respective bounding box for each location (or multiple bounding boxes for each location corresponding to respective possible classes), as described above.

The feature extractor neural network 120 can also provide the input embeddings 122 to the embedding neural network 130. The embedding neural network 130 is configured to process the input embeddings 122 and to generate a respective updated embedding 132 for each of one or more locations in the environment represented by respective input embeddings 122.

The embedding neural network 130 can include one or more convolutional neural network layers that are configured to process the input embeddings 122 to generate the updated embeddings 132. For example, as described above, the input embeddings 122 can be represented by an image, and the embedding neural network 130 can process the image using convolutional neural network layers to embed contextual information from neighboring locations in the environment in the updated embeddings 132. Instead or in addition, the object prediction neural network 140 can include one or more feedforward neural network layers that are configured to process the input embedding 122 corresponding to a location (or an updated representation of the input embedding 122 generated by a convolutional neural network layer) to generate the updated embedding 132 for the location.

In some implementations, the embedding neural network 130 includes multiple embedding subnetworks that each generate updated embeddings for locations in the environment. An example embedding neural network with multiple embedding subnetworks is discussed in more detail below with reference to FIG. 2.

In some implementations, the embedding neural network 130 processes the input embeddings 122 (or an updated representation of the input embeddings 122) using a graph neural network; this process is described in more detail below with reference to FIG. 4.

In some implementations, the embedding neural network 130 generates a respective updated embedding 132 for each location represented by the input embeddings 122; in some other implementations, the embedding neural network 130 selects a strict subset of the locations represented by the input embeddings 122 and generates a respective updated embedding 132 for each location in the strict subset.

For example, the embedding neural network 130 can obtain the object predictions 142 generated by the object prediction neural network 140 and use the object predictions 142 to select one or more locations in the environment for which to generate a respective updated embedding 132. For example, the embedding neural network 130 can select each location in the environment for which the corresponding object prediction 142 indicates a high likelihood that an object is actually located at the location. As a particular example, the embedding neural network 130 can select each location for which a value representing the likelihood that there is an object at the location (or the likelihood that there is an object of a particular type at the location) exceeds a predetermined threshold, e.g., 0.25, 0.5, 0.75, or 0.9.

In some implementations, the embedding neural network 130 and the object prediction neural network 140 are the same neural network; that is, a single neural network can process the input embeddings 122 and generate the object predictions 142 and the updated embeddings 132.

The output engine 150 is configured to obtain the object predictions 142 generated by the object prediction neural network 140 and process the object predictions 142 to generate the network output 152 identifying one or more detected objects in the environment represented by the network input 112. For each of one or more detected objects, the network output 152 can identify a location in the environment at which the detected object is located, e.g., a three-dimensional coordinate in a coordinate system of the environment or a two-dimensional coordinate (e.g., an identification of a pixel representing the center of the object) in an image of the environment included in the network input 112. The network output 152 can also include, for each of the one or more detected objects, an identification of the class of the object and/or the dimensions of the object (e.g., as represented by a bounding box).

The output engine 150 can determine the one or more detected objects by evaluating the object predictions 142 against one or more criteria. For example, the output engine 150 can determine each location in the environment for which the corresponding object prediction 142 indicates a high likelihood that an object is located at the location, e.g., by determining each location for which the value representing the likelihood that an object is location at the location exceeds a predetermined threshold, e.g., 0.5, 0.9, or 0.95.

In some implementations, the output engine 150 can determine whether multiple object predictions 142 (corresponding to respective locations in the environment) correspond to the same possible object, in order to avoid including duplicate identifications of the same object in the network output 152. For example, if multiple locations within a threshold distance of each other in the environment have respective object predictions 142 that satisfy the criteria discussed above, then the output engine 150 can select a single location from the multiple locations to identify in the network output 152 (e.g., by selecting the location that has the highest corresponding likelihood value). As another example, the output engine 150 can process the object predictions 142 using a clustering algorithm to identify sets of multiple locations that correspond to the same respective possible object.

In some implementations, the output engine 150 also obtains the updated embeddings 132 generated by the embedding neural network 130 and process the updated embeddings 132 to generate the network output 152. For example, the output engine 150 can include one or more neural networks (sometimes referred to as "downstream" neural networks because they follow the embedding neural network 130 and the object prediction neural network 140) that are configured to process (i) the updated embeddings 132 and (ii) the object predictions 132 to generate the network output 152.

The training system 160 is configured to determine trained values for the parameters of the object detection neural network 110, i.e., trained values for the parameters of one or more of: the feature extractor neural network 120, the embedding neural network 130, or the object prediction neural network 140. The training system 160 processes multiple training network inputs 112 using the object detection neural network 110 to generate respective training network outputs 152, and determines updates to the parameter values of the object detection neural network 110 according to an error in the training network outputs 152.

In particular, the training system 160 can determine updates to the parameter values of the object detection neural network 110 by processing the updated embeddings 132 generated by the embedding neural network 130 using a contrastive loss function. For each pair of updated embeddings 132, the training system 160 can process the pair of updated embeddings using the contrastive loss function to generate a contrastive loss value that represents a difference between the pair of updated embeddings 132.

For each pair of updated embeddings 132, the training system 160 can determine the contrastive loss value according to whether the pair of updated embeddings 132 correspond the same possible object that may be in the environment. That is, the training system 160 can determine whether the pair of object predictions 142 that correspond to the locations of the pair of updated embeddings 132 represent the same possible object.

For pairs of updated embeddings 132 that correspond the same possible object, the contrastive loss value can be proportional to the difference between the updated embeddings 132. For pairs of updated embeddings 132 that do not correspond the same possible object, the contrastive loss value can be inversely proportional to the difference between the updated embeddings 132. Thus, the contrastive loss values encourage the updated embeddings 132 that correspond to the same possible object to be similar, while encouraging the updated embeddings 132 that correspond to different possible objects to be dissimilar.

In this specification, a contrastive loss value is "proportional" to a difference between embeddings if the contrastive loss value increases as the difference increases. That is, the contrastive loss value is a monotonically increasing function of the difference; the function does not have to be linear or constant. Similarly, a contrastive loss value is "inversely proportional" to a difference between embeddings if the contrastive loss value decreases as the difference increases. That is, the contrastive loss value is a monotonically decreasing function of the difference; the function does not have to be linear or constant.

In some implementations, for each pair of updated embeddings 132, the training system 160 can use the corresponding pair of object predictions 142 to determine whether the pair of object predictions 142 characterize the same possible object. For example, the system can determine that the pair of object predictions 142 characterize the same possible object if one or more of the following criteria are met: (i) for both object predictions 142, the likelihood that an object is actually located at the respective location in the environment exceeds a first predetermined threshold, e.g., 0.5, 0.75, or 0.9; (ii) the respective predicted classes of the pair of object predictions 142 is the same; (iii) for both object predictions 142, the likelihood that the possible object is the predicted class exceeds a second predetermined threshold, e.g., 0.5, 0.75, or 0.9; or (iv) the dimensions of the respective possible objects, e.g., the bounding boxes identified by the pair of object predictions 142, overlap by a predetermined threshold amount, e.g., a cubic volume in a coordinate system of the environment or a number of pixels in an image of the environment.

In implementations where the object prediction 142 for each location includes, for each possible class of the possible object at the location, respective data representing dimensions of the corresponding possible object, the system can determine that the pair of object predictions 142 characterize the same possible object if the following criteria are met (and, optionally, one or more other criteria): (i) the respective predicted classes of the pair of object predictions 142 is the same and (ii) the dimensions of the respective possible objects corresponding to the predicted class of the object predictions 142 overlap by a predetermined threshold amount.

In some other implementations, in addition to using the pair of object predictions 142, the training system 160 can use a ground-truth network output corresponding to the network input 112 to determine whether the pair of updated embeddings 132 corresponds to the same possible object. The ground-truth network output identifies one or more objects that are actually located in the environment. For example, the ground-truth network output can be used to train the object prediction neural network in a supervised manner. An object that is identified in the ground-truth network output is called a "ground-truth object."

For each ground-truth object, the ground-truth network output can identify one or more of: a location of the ground-truth object in the environment, e.g., a three-dimensional coordinate in a coordinate system of the environment or a two-dimensional coordinate (e.g., an identification of a pixel representing the center of the ground-truth object) in an image of the environment included in the network input 112. The ground-truth network output can also identify, for each ground-truth object, an identification of the class of the ground-truth object and/or the dimensions of the ground-truth object (e.g., as represented by a bounding box as described above).

For each object prediction 142 corresponding to a respective location, the training system 160 can determine whether the object prediction 142 characterizes one of the ground-truth objects identified in the ground-truth network output. For example, the training system 160 can determine that the possible object characterized by the object prediction 142 is the same as a particular ground-truth object if one or more of the following criteria are met: (i) the likelihood that an object is actually located at the location corresponding to the object prediction 142 exceeds a first predetermined threshold, e.g., 0.5, 0.75, or 0.9; (ii) the predicted class of the possible object is the same as the class of the ground-truth object; (iii) the likelihood that the possible object is the class of the ground-truth object exceeds a second predetermined threshold, e.g., 0.5, 0.75, or 0.9; or (iv) the dimensions of the possible object and the dimensions of the ground-truth object overlap by predetermined threshold amount, e.g., a cubic volume in a coordinate system of the environment or a number of pixels in an image of the environment.

In implementations where the object prediction 142 for each location includes, for each possible class of the possible object at the location, respective data representing dimensions of the corresponding possible object, the system can determine that the possible object characterized by the object prediction 142 is the same as a particular ground-truth object if the following criteria are met (and, optionally, one or more other criteria): (i) the predicted class of the possible object is the same as the class of the ground-truth object and (ii) the dimensions of the possible object corresponding to the class of the ground-truth object and the dimensions of the ground-truth object overlap by a predetermined threshold amount.

In some cases, for a particular object prediction 142, the object prediction 142 might satisfy the criteria for characterizing multiple different ground-truth objects. In these cases, the training system 160 can determine one of the multiple different ground-truth objects that is the closest match to the object prediction 142. For example, the training system 160 can determine the ground-truth object with which the possible object overlaps the most, e.g., the largest overlapping cubic volume or the largest number of overlapping pixels.

In some implementations, each object prediction 142 can characterize a possible object that is classified as either a background class or a foreground class, described above. Generally, the ground-truth objects are each classified as a foreground class. If a possible object is classified as a background class (e.g., if the likelihood that the possible object is a particular background class, as identified in the corresponding object prediction 142, is larger than the likelihood that the possible object is any particular foreground class), then the training system 160 can determine that the possible object does not correspond to any ground-truth object. If a possible object is classified as a foreground class (e.g., the likelihood that the possible object is a particular foreground class, as identified in the corresponding object prediction 142, is larger than the likelihood that the possible object is any particular background class) and the possible object satisfies the criteria to correspond to a ground-truth object as described above, then the training system 160 can determine that the possible object corresponds to the ground-truth object. If a possible object is classified as a foreground class but the possible object does not satisfy the criteria to correspond to any ground-truth object as described above, then the training system 160 can determine that the possible object is a "false positive" (i.e., is not actually located in the environment), and determine that the possible object does not correspond to any ground-truth object.

The training system 160 can then determine, for each pair of object predictions 142, whether the pair of object predictions 142 correspond the same possible object using to the determination, for each object prediction 142, of whether the object prediction 142 corresponds to a ground-truth object in the ground-truth network output. For example, the training system 160 can determine that a pair of object predictions 142 correspond to the same possible object if and only if the pair of object predictions 142 both correspond to the same ground-truth object.

After determining, for each pair of object predictions 142, whether the pair of object predictions 142 correspond the same possible object (e.g., using only the object predictions 142 or using the object predictions in conjunction with a ground-truth network output), the training system 160 can compute the contrastive loss value for the corresponding pair of updated embeddings.

The contrastive loss function for a pair updated embeddings corresponding to locations i and j can take the following form:

$$L_{contrastive}(i,j) = \mathbb{1}_{o_i=o_j}\{F_1(D(e_i,e_j))\} + \mathbb{1}_{o_i \neq o_j}\{F_2(D(e_i,e_j))\}$$

where $o_i$ and $o_j$ are the possible objects of location i and j, respectively; $e_i$ and $e_j$ are the updated embeddings of location i and j, respectively; $\mathbb{1}$ is the indicator function; D is a distance function; $F_1$ is a monotonically increasing function; and $F_2$ is a monotonically decreasing function.

For example, the contrastive loss function can be:

$$L_{contrastive}(i,j) = \mathbb{1}_{o_i=o_j}\{\|e_i-e_j\|_1\} + \mathbb{1}_{o_i \neq o_j}\{\max\{E-\|e_i-e_j\|_1, 0\}\}$$

where E is a scalar value that can be a hyperparameter of the object detection neural network 110, and $\|\cdot\|_1$ is the $L_1$ distance. That is, D can be the $L_1$ distance, $F_1(d)$ can be the identify function, and $F_2(d)$ can be $\max\{E-d, 0\}$.

Although the $L_1$ distance $\|\cdot\|_1$ is used in these examples, generally any appropriate distance function can be used, e.g., the L2 distance $\|\cdot\|_2$ or the Huber loss function.

In other words, the contrastive loss function can be:

$$L_{contrastive}(i,j) = \begin{cases} \|e_i - e_j\|_1 & o_i = o_j \\ \max\{E - \|e_i - e_j\|_1, 0\} & o_i \neq o_j \end{cases}$$

In some implementations, the contrastive loss function for each pair of updated embeddings can include more than the two cases described above, i.e., (i) a first case for the event that the pair of updated embeddings corresponds to the same possible object and (ii) a second case for the event that the pair of updated embeddings correspond to different possible objects. For example, the contrastive loss function can include a case for the event that the pair of updated embeddings correspond to different possible objects that are the same foreground class of object. As another example, the contrastive loss function can include a case for the event that the pair of updated embeddings correspond to different possible objects that are the same background class of object. As another example, the contrastive loss value can include a case for the event that the pair of updated embeddings correspond to different possible objects that are respective different foreground classes. As another example, the contrastive loss value can include a case for the event that the pair of updated embeddings correspond to different possible objects that are respective different background classes. As another example, the contrastive loss function can include a case for the event that the pair of updated embeddings correspond to different possible objects, where the first possible object is a foreground class and the second possible object is a background class.

The different cases can be determined in order to encourage the respective updated embeddings corresponding to different types of possible objects to have a particular relationship. For example, the contrastive loss function can encourage the updated embeddings corresponding to different possible objects that are the same foreground class to be more similar than the updated embeddings corresponding to different possible objects that are different foreground classes, but more dissimilar than the updated embeddings corresponding to the same possible object. As another example, the contrastive loss function can encourage a pair of updated embeddings corresponding to different possible objects that are different foreground classes to be more similar than a pair of updated embeddings corresponding to a first possible object that is a foreground class and a second possible object that is a background class. As another example, the contrastive loss function can encourage a pair of updated embeddings corresponding to different possible objects that are different foreground classes to be more similar than a pair of updated embeddings corresponding to possible objects that are each a background class.

For example, the contrastive loss function can be:

$$L(i, j) = \begin{cases} \|e_i - e_j\|_1 & o_i = o_j \\ \max\{E_1 - \|e_i - e_j\|_1, 0\} & o_i \neq o_j, \ c(o_i) = c(o_j), \ c(o_i) \in F, \ c(o_j) \in F \\ \max\{E_2 - \|e_i - e_j\|_1, 0\} & o_i \neq o_j, \ c(o_i) \neq c(o_j), \ c(o_i) \in F, \ c(o_j) \in F \\ \max\{E_3 - \|e_i - e_j\|_1, 0\} & o_i \neq o_j, \ c(o_i) \neq c(o_j), \ c(o_i) \in F, \ c(o_j) \in B \\ \max\{E_4 - \|e_i - e_j\|_1, 0\} & o_i \neq o_j, \ c(o_i) \in B, \ c(o_j) \in B \end{cases}$$

where $E_1$, $E_2$, $E_3$, and $E_4$ are respective different scalar values that can be hyperparameters of the object detection neural network 110, c(o) is the class of possible object o, F is the set of all foreground classes, and B is the set of all background classes. In some implementations, there is a single background class as described above.

The values for $E_1$, $E_2$, $E_3$, and $E_4$ can be any combination of values, and can be determined to encourage respective relationship between updated embeddings. That is, the magnitude of the values for $E_1$, $E_2$, $E_3$, and $E_4$ can encourage a similarity or dissimilarity between respective updated embeddings, as described above. A smaller E value encourages the updated embeddings to be more similar than a larger E value. In particular, the distance between a pair of updated embeddings that satisfy the criteria of the case corresponding to $E_i$ is encouraged to be at least $E_i$.

The respective E values can have any relationship to each other. For example, the respective values can be determined such that $E_1 < E_2 < E_3 \leq E_4$. As another example, the respective values can be determined such that $E_1 < E_2 < E_4 \leq E_3$.

The training system 160 can determine, for each pair of updated embeddings 132, whether the pair of updated embeddings 132 correspond to possible objects that are the same class (or respective different foreground classes, etc.) similarly to the determination of whether the updated embeddings 132 correspond to the same possible object, as described above.

For example, the training system 160 can compare the object embeddings 142 corresponding to the pair of updated embeddings 132, e.g., by determining that a possible object is a particular class if the likelihood that the possible object is the particular class exceeds a predetermined threshold.

As another example, the training system 160 can determine that the pair of updated embeddings 132 correspond to different possible objects that are the same class if the possible objects have been determined to correspond to respective different ground-truth objects that are the same class (or respective different foreground classes, etc.).

After determining the respective contrastive loss value between each pair of updated embeddings 132, the training system 160 can determine an update to the values of the parameters of the object detection neural network 110 according to the contrastive loss values. For example, the training system 160 can determine an update to the values for the feature extractor neural network 120 and the embedding neural network 130, e.g., by backpropagating the contrastive loss values through the embedding neural network 130 to the feature extractor neural network 120.

In some implementations, the embedding neural network 130 is included in the object detection neural network 110 only during training of the object detection neural network. That is, when the training is completed, the object detection neural network 110 is deployed to an inference system without the embedding neural network. Once deployed, the embedding neural network 130 generates network outputs 152 by processing network inputs 112 using the feature extractor neural network 120, the object prediction neural network 140, and the output engine 150. In these implementations, the output engine 150 does not receive as input the updated embeddings 132 generated by the embedding neural network 130 (because the embedding neural network 130 is not available at inference time).

Removing the embedding neural network 130 after training can improve the computational and/or time efficiency of the object detection neural network 110 at inference time. That is, fewer computational and/or memory resources are consumed at inference time and the throughput of the object detection neural network 110 can be improved at inference time because the embedding neural network 130 is not executing.

Including the embedding neural network 130 during training can improve the performance of the object detection neural network 110. For example, the contrastive loss values can be backpropagated through the embedding neural network 130 and to the feature extractor neural network 120, improving the performance of the feature extractor neural network 120 by encouraging the feature extractor neural network 102 to generate better input embeddings 122.

In some implementations, the object detection neural network 110 does not include the embedding neural network 130 at all, even during training. Instead, the training system 160 can perform contrastive learning on the feature extractor neural network 110. That is, the training system 160 can determine contrastive loss values for each pair of input embeddings 122 in the same way described above that the training system 160 can determine contrastive loss values for each pair of updated embeddings 132. The training system 160 can then determine updated to the parameter values of the feature extractor neural network 120 using the contrastive loss values between the respective pairs of input embeddings 122.

In some implementations, after the object detection neural network 110 has been trained, the object detection neural network 110 is deployed onto an autonomous or semi-autonomous vehicle, and used by the vehicle to detect objects in the environment of the vehicle. For example, one or more sensors on-board the vehicle, e.g., one or more cameras and/or one or more LIDAR sensors, can capture sensor data of the environment, and generate a network input 112 for the object detection neural network 110 from the sensor data. The vehicle can then process the network input 112 using the object detection neural network 110 to generate a network output 152 identifying one or more objects in the environment of the vehicle.

In these implementations, after generating the network output 152, the object detection neural network 110 can provide the network output to one or more other on-board systems of the vehicle for further processing.

For example, the vehicle can use the network output 152 to make autonomous driving decisions. As a particular example, the network output 152 may identify a pedestrian in the environment of the vehicle who has stepped in front of the vehicle, potentially causing a collision. In this example, the vehicle can apply the brakes and/or generate a new planned path for the vehicle that avoids the potential collision.

As another example, the network output 152 can be provided to a user interface system of the vehicle. When the user interface system receives the network output 152, the user interface system can use the network output 152 to present information to the driver of the vehicle to assist the driver in operating the vehicle safely. The user interface system can present information to the driver of the vehicle by any appropriate means, for example, by an audio message transmitted through a speaker system of the vehicle or by alerts displayed on a visual display system in the agent (e.g., an LCD display on the dashboard of the vehicle). In a particular example, the network output 152 may identify a pedestrian in the environment of the vehicle who has stepped in front of the vehicle, potentially causing a collision. In this example, the user interface system can present an alert message to the driver of the vehicle with instructions to adjust the trajectory of the vehicle to avoid a collision or notifying the driver of the vehicle that a collision with the pedestrian is likely.

Figure 2:
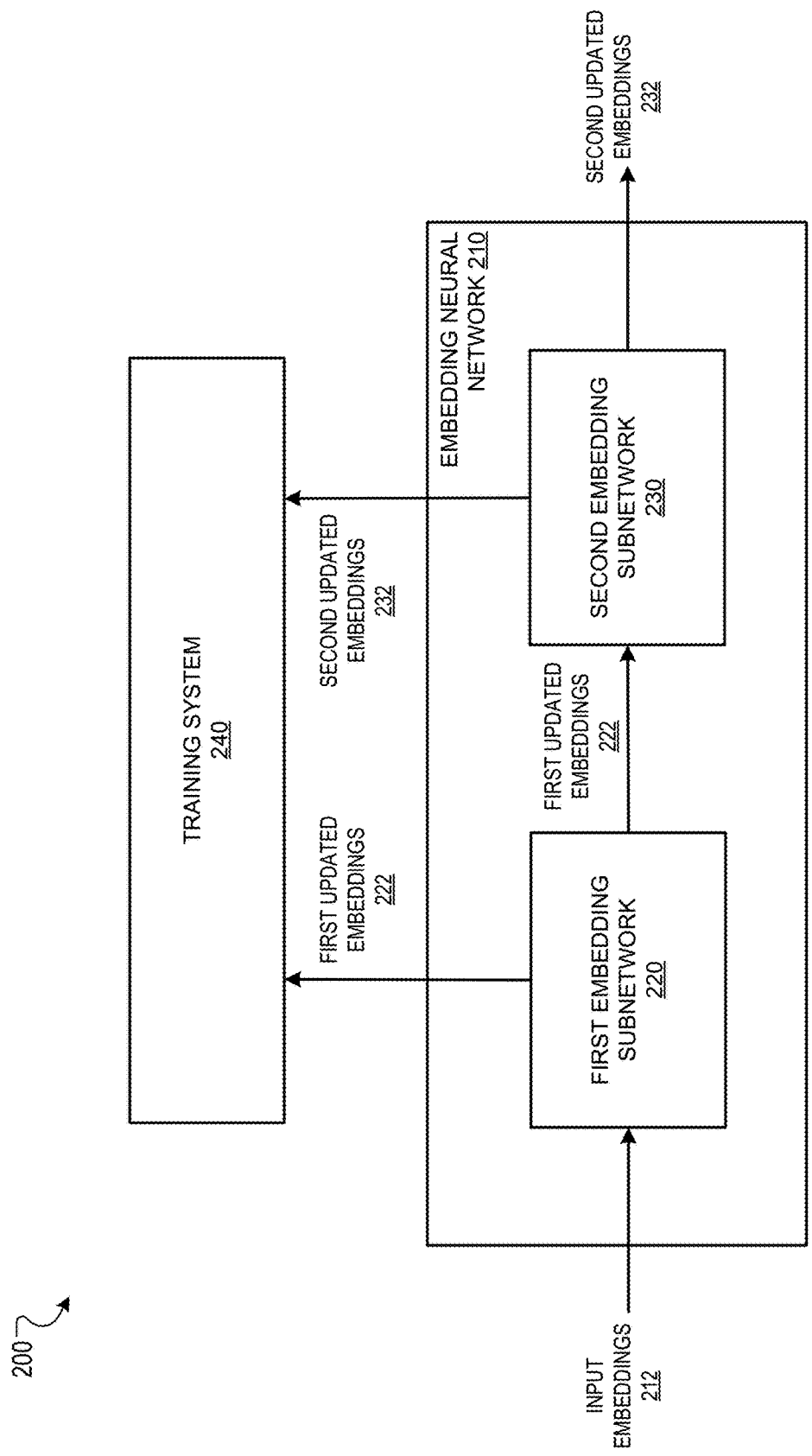
FIG. 2 is a diagram of an example system that includes an embedding neural network.

FIG. 2 is a diagram of an example system 200 that includes an embedding neural network 210. The system 200 is an example of a system implemented as computer programs on one or more computers in one or more locations, in which the systems, components, and techniques described below can be implemented.

The embedding neural network 210 can be a component of an object detection neural network, e.g., the object detection neural network 110 depicted in FIG. 1, that is configured to process a network input that represents an environment and to generate a network output that identifies one or more object that are in the environment.

The system 200 also includes a training system 240 that is configured to train the object detection neural network.

The embedding neural network 210 is configured to receive a set of input embeddings 212 and to process the input embeddings 212 to generate a set of second updated embeddings 232. Each input embedding 212 represents a respective location in the environment of the network input of the object detection neural network.

The embedding neural network 210 includes a first embedding subnetwork 220 and a second embedding subnetwork 230. The first embedding subnetwork 220 is configured to process the input embeddings 212 and to generate a set of first updated embeddings 222. Each first updated embedding 222 represents a respective location in the environment. In some implementations, the first embedding subnetwork 220 generates a respective first updated embedding 222 for each input embedding 212. In some other implementations, the first embedding subnetwork 220 selects a subset of the input embeddings 212 and generates a respective first updated embedding 222 for each input embedding 212 in the selected subset. For example, as described above, the first embedding subnetwork 220 can select the subset of input embeddings 212 using respective object predictions for each location in the environment generated by an object prediction neural network of the object detection neural network, e.g., the object prediction neural network 140 depicted in FIG. 1.

The second embedding subnetwork 230 is configured to process the first updated embeddings 222 and to generate the set of second updated embeddings 232. Each second updated embedding 232 represents a respective location in the environment. In some implementations, the second embedding subnetwork 230 generates a respective second updated embedding 232 for each first updated embedding 222. In some other implementations, the second embedding subnetwork 230 selects a subset of the first updated embeddings 222 and generates a respective second updated embedding 232 for each first updated embedding 222 in the selected subset.

The training system 240 is configured to train the embedding neural network 210 and, optionally, one or more other subnetworks of the object detection neural network, using one or more contrastive loss functions.

In particular, the training system 240 can obtain the first updated embeddings 222, and determine a respective first contrastive loss value for each pair of first updated embeddings 222, as described above. The training system can determine an update to the values of the parameters of the first embedding subnetwork 220 using the first contrastive loss values.

The training system 240 can obtain the second updated embeddings 232, and determine a respective second contrastive loss value for each pair of second updated embeddings 232, as described above. The training system can determine an update to the values of the parameters of the second embedding subnetwork 230 and, optionally, the first embedding subnetwork 220 using the second contrastive loss values, e.g., by backpropagating the second contrastive loss values through the second embedding subnetwork 230 to the first embedding subnetwork 220.

In some implementations, the training system 240 uses the same contrastive loss function to determine both the first contrastive loss values for the first updated embeddings 222 and the second contrastive loss values for the second updated embeddings 232. In some other implementations, the training system 240 uses a first contrastive loss function to determine the first contrastive loss values for the first updated embeddings 222, and a second contrastive loss function to determine the second contrastive loss values for the second updated embeddings 232.

In some implementations, one or both of the first embedding subnetwork 220 and the second embedding subnetwork 230 generate the respective updated embeddings using a graph neural network. This process is described in more detail below with reference to FIG. 4.

In some implementations, the training system 240 determines an update to the parameter values of one or more other subnetworks of the object detection neural network using the first contrastive loss values and/or the second contrastive loss values. For example, the training system 240 can backpropagate the first contrastive loss values and/or the second contrastive loss values to the one or more other subnetworks. As another example, the training system 240 can combine the first contrastive loss values and the second contrastive loss values to determine combined contrastive loss values, and use the combined contrastive loss values to determine the update to the parameter values of the one or more other subnetworks.

Figure 3:
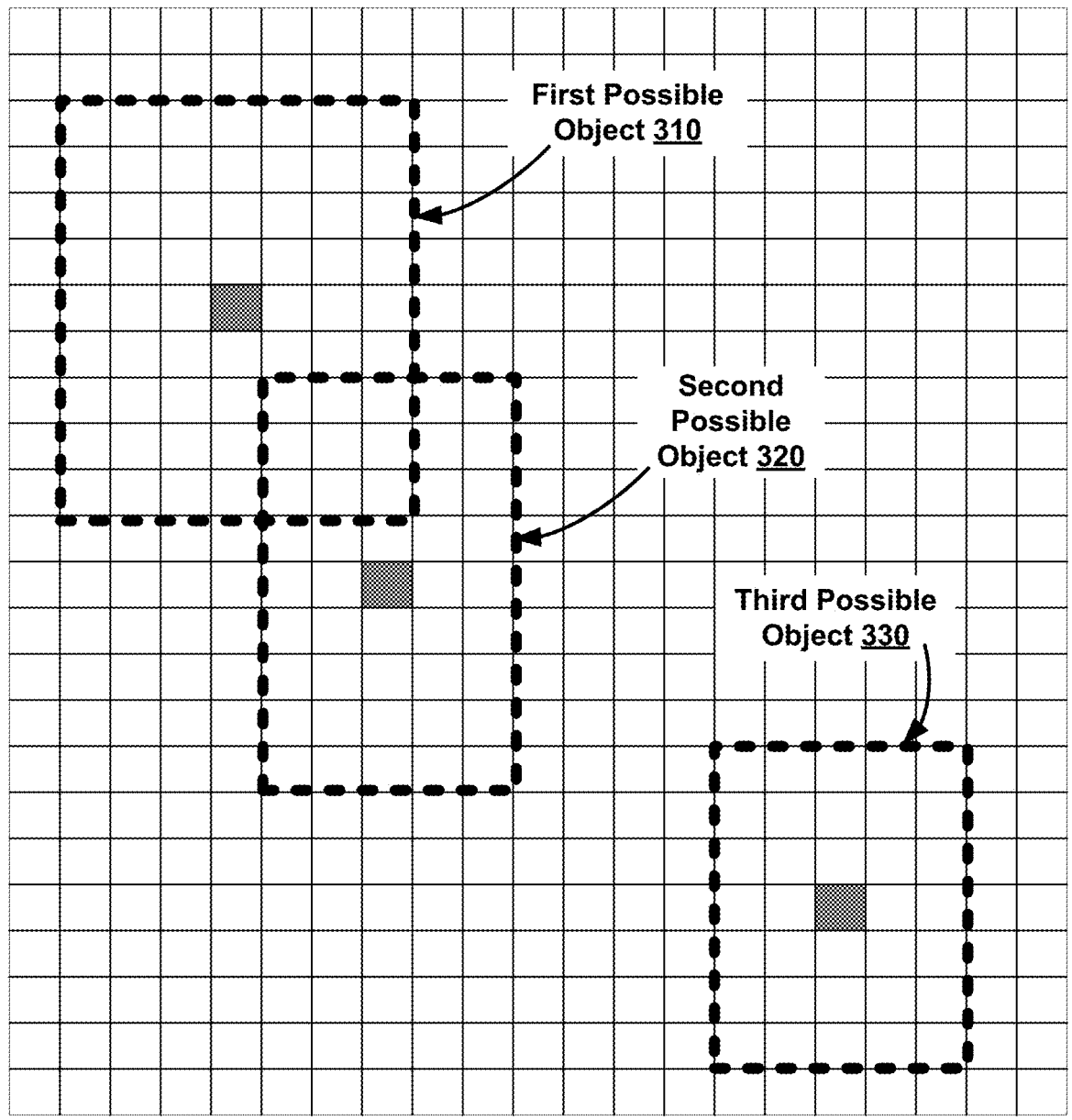
FIG. 3 is an illustration of example object predictions generated by an object prediction neural network.

FIG. 3 is an illustration of example object predictions 300 generated by an object prediction neural network. The object prediction neural network can be a component of an object detection neural network that is configured to process a network input that represents an environment and to generate a network output that identifies one or more object that are in the environment. For example, the object prediction neural network can be the object prediction neural network 140 depicted in FIG. 1.

The object prediction neural network can generate a respective object prediction 300 for each location in the environment. For example, if the network input includes an image of the environment, then the object prediction neural network can generate a respective object prediction 300 for each pixel in the image, where each pixel corresponds to a location in the environment, as illustrated in FIG. 3.

The object prediction 300 for each location characterizes a possible object that may be located at the location in the environment, and can include data describing the dimensions of the possible object. For example, the object prediction 300 for each location can include a bounding box, e.g., a two-dimensional bounding box centered at the pixel representing the location and defined by a width parameter and a height parameter (e.g., where both parameters identify a number of pixels in the image). The bounding boxes of three object predictions 300 are illustrated in FIG. 3 (although each element of the illustrated image, corresponding to respective object predictions 300, can have a bounding box).

As described above, in some implementations, the object prediction 300 for each location can include, for each possible class of objects in the environment, a respective bounding box. The three bounding boxes illustrated in FIG. 3 can all correspond to the same possible class.

In particular, FIG. 3 illustrates the bounding box for a first possible object 310, which has a width of seven pixels and a height of nine pixels centered around the pixel corresponding to the location of the first possible object 310; the bounding box for a second possible object 320, which has a width of five pixels and a height of nine pixels centered around the pixel corresponding to the location of the second possible object 320; and the bounding box for a third possible object 330, which has a width of five pixels and a height of seven pixels centered around the pixel corresponding to the location of the third possible object 330.

The object predictions 300 and a corresponding set of embeddings corresponding to each location in the environment can be processed by a training system to determine a contrastive loss value for each pair of embeddings, as described above with reference to FIG. 1.

The training system can, for each pair of object predictions 300, use the respective bounding boxes defined by the pair object predictions 300 to determine whether the pair of object predictions 300 characterize the same possible object. As a particular example, the training system can determine that the object predictions 300 do characterize the same possible object if the overlap between the respective bounding boxes satisfies a predetermined threshold, e.g., 0.1 (i.e., 10% the area of the bounding box).

For example, the training system can determine that the first possible object 310 and the second possible object 320 are the same possible object because there is an overlap of nine pixels between the respective bounding boxes, which is larger than 10% of the area of the bounding box of either possible object 310 and 320. As another example, the training system can determine that the first possible object 310 and the third possible object 330 are not the same possible object, because there is no overlap between the respective bounding boxes.

Therefore, as described above, the training system can determine a contrastive loss value that encourages the embeddings corresponding to the first possible object 310 and the second possible object 320 to be similar. Similarly, the training system can determine a contrastive loss value that encourages the embeddings corresponding to the first possible object 310 and the third possible object 330 to be dissimilar.

Figure 4:
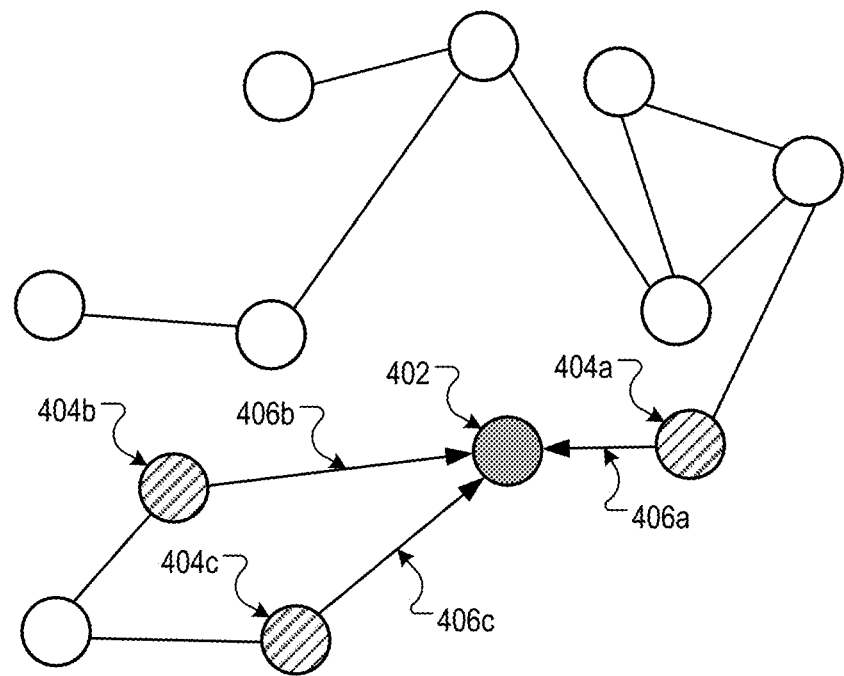
FIG. 4 is an illustration of an example graph representing an environment.

FIG. 4 is an illustration of an example graph 400 representing an environment. The graph 400 can be used by a graph neural network to update embeddings for each of multiple locations in the environment.

The graph neural network can be a component of an embedding neural network that is configured to process input embeddings and to generate updated embeddings corresponding to each of the multiple locations in the environment. The embedding neural network can be a component of an object detection neural network, e.g., the object detection neural network 110 depicted in FIG. 1, that is configured to process a network input that represents the environment and to generate a network output that identifies one or more object that are in the environment.

Each node of the graph represents a respective location in the environment. In some implementations, the graph 400 includes a respective node for each location in the environment represented in the network input of the object detection neural network, e.g., a respective node for each pixel of an image captured of the environment. In some other implementations, the embedding neural network determines a subset of the locations represented by the network input, and generates the graph 400 such that there is a node for each location in the determined subset. For example, the embedding neural network can determine, for each location represented by the network input, a likelihood that there is an object located at the location, and include in the subset only locations that have a high corresponding likelihood. For example, the embedding neural network can obtain, from an object prediction neural network (e.g., the object prediction neural network 140 depicted in FIG. 1), an object prediction for each location that includes a likelihood that there is an object (or an object of a particular class) located at the location. The embedding neural network can then include each location whose likelihood exceeds a predetermined threshold, e.g., 0.25, 0.5, 0.75, or 0.9, in the subset.

In some implementations, there is an edge in the graph 400 between each pair of nodes in the graph 400. In some other implementations, there is an edge between each pair of nodes in the graph that correspond to locations that are proximate to each other. For example, the graph 400 can include an edge between each pair of nodes that correspond to locations that are within a threshold distance of each other, e.g., a distance in a three-dimensional coordinate system of the environment or a number of pixels in an image of the environment. As another example, the object prediction for each location can include data defining dimensions of the possible object located at the location, and the graph 400 can include an edge between each pair of nodes that correspond to locations whose object predictions identify an overlap between the dimensions. As a particular example, the graph 400 can include an edge between each pair of nodes whose corresponding object predictions define bounding boxes that have an overlap that exceeds a predetermined threshold, e.g., 0.1, 0.25, 0.5, 0.7, or 0.9. As another example, the graph 400 can include an edge between each pair of nodes that correspond to locations whose object predictions are determined to characterize the same ground-truth object in the environment, as described above. Generally, the weights of the graph 400 are bidirectional. In some implementations, there is an implicit edge between each node in the graph 400 and itself (i.e., each node has a self-loop).

Each node in the graph has an embedding. Before execution of the graph neural network, the embedding of each node can be the initial embedding provided to the embedding neural network corresponding to the location represented by the node.

At each of multiple processing time steps, the graph neural network can update the embedding of each node in the graph 400 by pooling contextual information from the neighboring nodes of the node. In particular, at each processing time step, the graph neural network can generate an updated embedding for each node by combining (i) the current embedding for the node and (ii) the current embeddings for each neighboring node in the graph 400. For example, at each processing time step, the graph neural network can generate an updated embedding for a node 402 of the graph using (i) the current embedding for the node 402 and (ii) the current embeddings for the three neighboring nodes 404*a-c* in the graph.

In some implementations, at each processing time step, the graph neural network determines an edge weight for the edge between each pair of nodes in the graph, and combines the respective embeddings according to the edge weights. For example, when updating the embedding for the node 402 at each processing time step, the graph neural network can determine an edge weight for the edges 406*a-c* between the node 402 and the neighboring nodes 404*a-c*, respectively. In some implementations, the edge weights are not symmetric; that is, the graph neural network can determine different edge weights for the edge 406*a* when updating the embedding for the node 402 and when updating the embedding for node 404*a*. In these implementations, each bidirectional node represents two unidirectional edges with respective different weights.

For example, to update the embedding for a particular node, the graph neural network can process each of (i) the current embedding of the particular node and (ii) the current embeddings for each neighboring node using one or more neural network layer, e.g., a single fully-connected neural network layer, to generate respective intermediate embeddings for the nodes. The graph neural network can then determine a weighted sum of the intermediate embeddings, where the embedding of each node is weighted according to the edge weight of the edge between the node and the particular node (where there is a weighted self-loop for the particular node). The graph neural network can then apply an activation function (e.g., a ReLU, Tanh, or sigmoid function) to the weighted sum to generate the updated embedding for the particular node.

In some implementations, the graph neural network can be a graph attention network, which applies an attention mechanism to each neighboring node of a particular node when updating the embedding for the particular node at each processing time step. The output of the attention mechanism for a neighboring node is the edge weight for the edge between the neighboring node and the particular node. As a particular example, the graph neural network can determine the edge weight between the neighboring node and the particular node by processing the current embedding for the particular node using a first fully-connected neural network layer, processing the current embedding for the neighboring node using a second fully-connected neural network layer, combining the outputs of the respective fully-connected neural network layers (e.g., using addition, multiplication, or concatenation), and applying a softmax to the combined output.

After the final processing time step, the embedding neural network can output the final updated embedding for each node in the graph (corresponding to respective location in the environment). A training system can then determine a contrastive loss value between each pair of updated embeddings, as described above.

Figure 5:
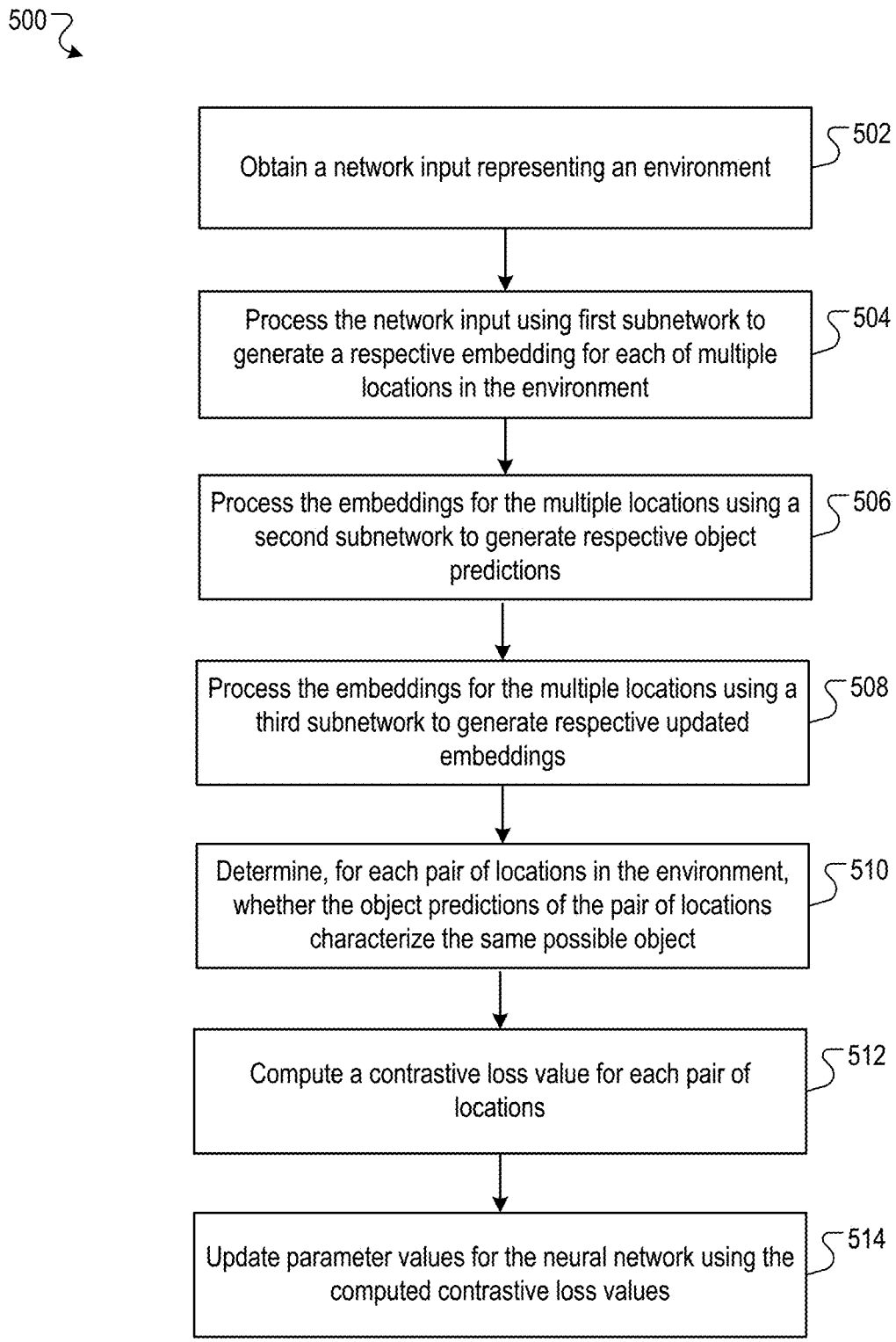
FIG. 5 is a flow diagram of an example process for training a neural network using contrastive learning.

FIG. 5 is a flow diagram of an example process 500 for training a neural network using contrastive learning. For convenience, the process 500 will be described as being performed by a system of one or more computers located in one or more locations. For example, a training system, e.g., the training system 160 depicted in FIG. 1, appropriately programmed in accordance with this specification, can perform the process 500.

The system obtains a network input representing an environment (step 502). The network input can include sensor data for each of multiple of locations in the environment.

The system processes the network input using a first subnetwork to generate a respective embedding for each of the multiple locations in the environment (step 504).

The system processes the embeddings for the multiple locations using a second subnetwork to generate, for each location, a respective object prediction (step 506). The object prediction for a location characterizes a possible object that may be located at the location in the environment.

The system processes the embeddings for the multiple locations using a third subnetwork to generate, for each location, a respective updated embedding for the location (step 508).

The system determines, for each pair of the multiple locations in the environment, whether the respective object predictions of the pair of locations characterize the same possible object or different possible objects (step 510).

The system computes a respective contrastive loss value for each pair of locations (step 512). For each pair of locations whose object predictions characterize the same possible object, the corresponding contrastive loss value can be proportional to a difference between the respective updated embeddings of the pair of locations. For each pair of locations whose object predictions characterize different possible objects, the corresponding contrastive loss value can be inversely proportional to a difference between the respective updated embeddings of the pair of locations.

The system updated parameter values for the neural network using the computed contrastive loss values (step 514). For example, the system can backpropagate the contrastive loss values through the first subnetwork and the third subnetwork to update respective parameter values of the subnetworks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network to detect one or more objects in an environment, the method comprising:
   obtaining a network input representing the environment, wherein the input comprises sensor data for each of a plurality of locations in the environment;
   processing the network input using a first subnetwork of the neural network to generate a respective embedding for each of the plurality of locations in the environment;
   processing the embeddings for each of the plurality of locations in the environment using a second subnetwork of the neural network to generate, for each of the plurality of locations in the environment, an object prediction that characterizes a possible object at the location in the environment;
   processing the embeddings for each of the plurality of locations in the environment using a third subnetwork of the neural network to generate an updated embedding for each of the plurality of locations in the environment;
   determining, for each of a plurality of pairs of the plurality of locations in the environment, whether the respective object predictions of the pair of locations characterize the same possible object or different possible objects;
   computing a respective contrastive loss value for each of the plurality of pairs of locations in the environment, wherein:
      for each pair of locations whose object predictions characterize the same possible object, the corresponding contrastive loss value is proportional to a difference between the respective updated embeddings of the pair of locations; and
      for each pair of locations whose object predictions characterize different possible objects, the corresponding contrastive loss value is inversely proportional to a difference between the respective updated embeddings of the pair of locations; and
   updating values for (i) a plurality of parameters of the first subnetwork and (ii) a plurality of parameters of the third subnetwork using the computed contrastive loss values.

2. The method of claim 1, wherein:
   for each of the plurality of locations in the environment, the object prediction characterizing a possible object at the location in the environment comprises a bounding box that characterizes dimensions of the possible object given that the possible object is actually located at the location in the environment.

3. The method of claim 2, wherein determining, for each of the plurality of pairs of locations in the environment, whether the respective object predictions of the pair of locations characterize the same possible object or different possible objects comprises:
   determining whether an overlap between the respective bounding boxes of the pair of locations satisfies a first threshold.

4. The method of claim 1, wherein:
   for each of the plurality of locations in the environment, the object prediction characterizing a possible object at the location in the environment comprises a class prediction that identifies, from a set of classes, a predicted class of the possible object given that the possible object is actually located at the location in the environment.

5. The method of claim 4, wherein determining, for each of the plurality of pairs of locations in the environment, whether the respective object predictions of the pair of locations characterize the same possible object or different possible objects comprises:
   determining whether the respective class predictions of the pair of locations are the same.

6. The method of claim 4, wherein the set of classes comprises one or more of:
   a pedestrian class,
   a vehicle class,
   a bicyclist class,
   a motorcyclist class, or
   a background class.

7. The method of claim 4, wherein:
the method further comprises determining, for each of the plurality of pairs of locations in the environment, whether the respective class predictions of the pair of locations are the same; and
for each pair of locations whose object predictions characterize different possible objects, computing a respective contrastive loss value for the pair of locations comprises:
 if determining that the class predictions of the pair of locations is the same, computing a lower contrastive loss value than if determining that the class predictions of the pair of locations is not the same.

8. The method of claim 4, wherein:
the method further comprises determining, for each of the plurality of pairs of locations in the environment, (i) whether the class prediction of a first location of the pair of locations is a background class or a foreground class and (ii) whether the class prediction of a second location of the pair of locations is a background class or a foreground class; and
for each pair of locations whose object predictions characterize different possible objects, computing a respective contrastive loss value for the pair of locations comprises:
 if determining that the class prediction of the first location of the pair of locations is a background class, computing a higher contrastive loss value than if determining that the respective class predictions of both locations of the pair of locations are respective foreground classes.

9. The method of claim 1, wherein determining, for each of the plurality of pairs of locations in the environment, whether the respective object predictions of the pair of locations characterize the same possible object or different possible objects comprises:
 obtaining data identifying one or more ground-truth objects that are actually located in the environment;
 determining, for each of the plurality of locations in the environment, whether the object prediction of the location characterizes one of the ground-truth objects; and
 determining, for each of the plurality of pairs of locations in the environment, that the respective object predictions of the pair of locations characterize the same possible object if the respective object predictions both characterize the same ground-truth object.

10. The method of claim 9, wherein:
for each ground-truth object, the obtained data comprises a bounding box that characterizes dimensions of the ground-truth object;
for each of the plurality of locations in the environment, the object prediction characterizing a possible object at the location in the environment comprises a bounding box that characterizes dimensions of the possible object given that the possible object is actually located at the location in the environment; and
determining that the object prediction of a particular location characterizes a particular ground-truth object comprises determining that an overlap between the bounding box of the object prediction and the bounding box of the particular ground-truth object satisfies a second threshold.

11. The method of claim 9, wherein:
for each ground-truth object, the obtained data identifies, from a set of classes, a class of the ground-truth object;
for each of the plurality of locations in the environment, the object prediction characterizing a possible object at the location in the environment comprises a class prediction that identifies, from the set of classes, a predicted class of the possible object given that the possible object is actually located at the location in the environment; and
determining that the object prediction of a particular location characterizes a particular ground-truth object comprises determining that the predicted class of the object prediction is the same as the class of the particular ground-truth object.

12. The method of claim 1, further comprising:
providing the respective updated embedding for each of the plurality of locations in the environment to a downstream subnetwork of the neural network for identifying one or more objects that are in the environment.

13. The method of claim 1, wherein, after the neural network has been trained, the neural network is deployed without the third subnetwork.

14. The method of claim 1, wherein the network input comprises one or more of:
 an image of the environment, and wherein each pixel in the image corresponds to a respective location of the plurality of locations in the environment; or
 LIDAR data projected onto an image plane.

15. The method of claim 1, wherein the third neural network comprises a graph neural network.

16. The method of claim 15, wherein processing the embedding for each of the plurality of locations in the environment using a third subnetwork of the neural network to generate an updated embedding for each of the plurality of locations in the environment comprises:
 determining a graph comprising a plurality of nodes and edges, wherein each node of the graph corresponds to a respective location of the plurality of locations in the environment;
 determining an initial updated embedding for each location in the environment represented by a node in the graph;
 at a first processing time step, processing the initial updated embeddings using the graph neural network to generate respective current updated embeddings for each location in the environment represented by a node in the graph; and
 at each of a plurality of subsequent processing time steps:
  processing the current updated embeddings using the graph neural network to update the current updated embeddings for each location in the environment represented by a node in the graph.

17. The method of claim 16, wherein the graph includes a node for each of the plurality of locations in the environment.

18. The method of claim 16, wherein:
for each of the plurality of locations in the environment, the object prediction characterizing a possible object at the location in the environment comprises (i) a class prediction that identifies a predicted class of the possible object given that the possible object is actually located at the location in the environment and (ii) a confidence value characterizing a confidence that an object of the predicted class is actually located at the location in the environment; and
the graph includes a node for each location in the environment that (i) has a predicted class that is a foreground class and (ii) has a confidence value that satisfies a third threshold.

19. The method of claim 16, wherein the graph includes an edge between each pair of nodes of the graph.

20. The method of claim 16, wherein:
for each of the plurality of locations in the environment, the object prediction characterizing a possible object at the location in the environment comprises a bounding box that characterizes dimensions of the possible object given that the possible object is actually located at the location in the environment; and
the graph includes an edge between each pair of nodes that correspond to a pair of locations for which an overlap between the respective bounding boxes of the pair of locations satisfies a fourth threshold.

21. The method of claim 16, wherein the initial updated embedding for each location in the environment represented by a node in the graph is the embedding for the location generated by the first subnetwork.

22. The method of claim 16, wherein determining an initial updated embedding for each location in the environment represented by a node in the graph comprises:
processing the embedding of the location generated by the first subnetwork using one or more neural network layers.

23. The method of claim 16, further comprising, at each of the plurality of processing time steps:
determining, for each edge incident to a first node and a second node of the graph, an edge weight for the edge by applying an attention mechanism to (i) the current updated embedding of the first node and (ii) the current updated embedding of the second node.

24. The method claim 1, further comprising:
processing the updated embedding for each location in a subset of the plurality of locations in the environment using a fourth subnetwork to generate a final embedding for each location in the subset of the plurality of locations;
computing a respective second contrastive loss value for each of a plurality of pairs of the subset of the plurality of locations in the environment using the respective final embeddings; and
updating values for (i) the plurality of parameters of the first subnetwork, (ii) the plurality of parameters of the third subnetwork, and (iii) a plurality of parameters of the fourth subnetwork using the computed second contrastive loss values.

25. A system comprising one or more computers and one or more storage devices storing instructions that when executed by the one or more computers cause the one more computers to perform operations for training a neural network to detect one or more objects in an environment, the operations comprising:
obtaining a network input representing the environment, wherein the input comprises sensor data for each of a plurality of locations in the environment;
processing the network input using a first subnetwork of the neural network to generate a respective embedding for each of the plurality of locations in the environment;
processing the embeddings for each of the plurality of locations in the environment using a second subnetwork of the neural network to generate, for each of the plurality of locations in the environment, an object prediction that characterizes a possible object at the location in the environment;
processing the embeddings for each of the plurality of locations in the environment using a third subnetwork of the neural network to generate an updated embedding for each of the plurality of locations in the environment;
determining, for each of a plurality of pairs of the plurality of locations in the environment, whether the respective object predictions of the pair of locations characterize the same possible object or different possible objects;
computing a respective contrastive loss value for each of the plurality of pairs of locations in the environment, wherein:
for each pair of locations whose object predictions characterize the same possible object, the corresponding contrastive loss value is proportional to a difference between the respective updated embeddings of the pair of locations; and
for each pair of locations whose object predictions characterize different possible objects, the corresponding contrastive loss value is inversely proportional to a difference between the respective updated embeddings of the pair of locations; and
updating values for (i) a plurality of parameters of the first subnetwork and (ii) a plurality of parameters of the third subnetwork using the computed contrastive loss values.

26. One or more non-transitory computer storage media storing instructions that when executed by one or more computers cause the one more computers to perform operations for training a neural network to detect one or more objects in an environment, the operations comprising:
obtaining a network input representing the environment, wherein the input comprises sensor data for each of a plurality of locations in the environment;
processing the network input using a first subnetwork of the neural network to generate a respective embedding for each of the plurality of locations in the environment;
processing the embeddings for each of the plurality of locations in the environment using a second subnetwork of the neural network to generate, for each of the plurality of locations in the environment, an object prediction that characterizes a possible object at the location in the environment;
processing the embeddings for each of the plurality of locations in the environment using a third subnetwork of the neural network to generate an updated embedding for each of the plurality of locations in the environment;
determining, for each of a plurality of pairs of the plurality of locations in the environment, whether the respective object predictions of the pair of locations characterize the same possible object or different possible objects;
computing a respective contrastive loss value for each of the plurality of pairs of locations in the environment, wherein:
for each pair of locations whose object predictions characterize the same possible object, the corresponding contrastive loss value is proportional to a difference between the respective updated embeddings of the pair of locations; and
for each pair of locations whose object predictions characterize different possible objects, the corresponding contrastive loss value is inversely proportional to a difference between the respective updated embeddings of the pair of locations; and updating values for (i) a plurality of parameters of the first subnetwork and (ii) a plurality of parameters of the third subnetwork using the computed contrastive loss values.

* * * * *